(12) United States Patent
Zeroug et al.

(10) Patent No.: US 10,809,405 B2
(45) Date of Patent: Oct. 20, 2020

(54) MEASUREMENT AND PROCESSING TO DETECT WEAK INTERFACIAL LAYERS IN HYDROCARBON-BEARING LAMINATED FORMATIONS WITH ACOUSTIC LOGGING DEVICES

(71) Applicant: SCHLUMBERGER TECHNOLOGY CORPORATION, Sugar Land, TX (US)

(72) Inventors: Smaine Zeroug, Lexington, MA (US); Bikash Kumar Sinha, Cambridge, MA (US); Peter Tilke, Watertown, MA (US); George Alan Waters, Oklahoma City, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 352 days.

(21) Appl. No.: 15/742,373

(22) PCT Filed: Jul. 5, 2016

(86) PCT No.: PCT/US2016/040933
§ 371 (c)(1),
(2) Date: Jan. 5, 2018

(87) PCT Pub. No.: WO2017/007745
PCT Pub. Date: Jan. 12, 2017

(65) Prior Publication Data
US 2018/0196157 A1    Jul. 12, 2018

Related U.S. Application Data

(60) Provisional application No. 62/188,834, filed on Jul. 6, 2015.

(51) Int. Cl.
*G01V 1/46* (2006.01)
*G01V 1/48* (2006.01)
(Continued)

(52) U.S. Cl.
CPC .............. *G01V 1/52* (2013.01); *G01V 1/46* (2013.01); *G01V 1/48* (2013.01); *E21B 47/005* (2020.05);
(Continued)

(58) Field of Classification Search
CPC ... G01V 1/46; G01V 1/52; G01V 1/48; G01V 2210/6222; E21B 47/0005; E21B 47/082; E21B 47/005; E21B 47/085
(Continued)

(56) References Cited

U.S. PATENT DOCUMENTS

| 5,763,773 A | 6/1998 | Birchak et al. |
| 6,018,496 A | 1/2000 | Stanke et al. |

(Continued)

FOREIGN PATENT DOCUMENTS

WO    2010/132927 A1    11/2010

OTHER PUBLICATIONS

"Borehole Imaging", in Sonatrach-Schlumberger Well Evaluation Conference—Algeria 2007, Published by Schlumberger 2007, pp. 3.28-3.65.

(Continued)

*Primary Examiner* — Daniel L Murphy
(74) *Attorney, Agent, or Firm* — Bridget M. Laffey; Gary Gex (57) ABSTRACT

Methods utilizing ultrasonic acoustic logging tools are provided for detecting thin formation layers that present markedly higher compliance than that of the surrounding rock in, for example, a laminated tight hydrocarbon-bearing formation. These layers may be interpreted as presenting potential interfacial and planes of weakness that may have bearing on the extent of a hydraulic fracture propagating across them.

34 Claims, 8 Drawing Sheets

(51) Int. Cl.
*G01V 1/52* (2006.01)
*E21B 47/005* (2012.01)
*E21B 47/085* (2012.01)

(52) U.S. Cl.
CPC .... *E21B 47/085* (2020.05); *G01V 2210/6222* (2013.01)

(58) Field of Classification Search
USPC .......................................................... 367/25
See application file for complete search history.

(56) References Cited

U.S. PATENT DOCUMENTS

| | | | | |
|---|---|---|---|---|
| 6,678,616 | B1* | 1/2004 | Winkler | G01V 1/44 181/104 |
| 2006/0233048 | A1 | 10/2006 | Froelich et al. | |
| 2009/0114472 | A1* | 5/2009 | Winkler | E21B 47/082 181/105 |
| 2010/0193676 | A1 | 8/2010 | Jacobson et al. | |

OTHER PUBLICATIONS

Havira, et al., "Ultrasonic Techniques in Oil Well Logging", Proceedings of IEEE Ultrasonic Symposium, 1986, pp. 563-571.
Miskimins, et al., "Modeling of Hydraulic Fracture Height Containment in Laminated Sand and Shale Sequences", SPE 80935, presented at the SPE Production and Operations Symposium, Oklahoma City, Oklahoma, USA, 2003, 11 pages.
Glaser, et al., "Seeking the Sweet Spot: Reservoir and Completion Quality in Organic Shales", Schlumberger Oilfield Review, 25(4), Winter 2013-2014, pp. 16-29.
Sone, et al., "Mechanical properties of shale gas reservoir rocks—Part 1: Static and dynamic elastic properties and anisotropy", Geophysics, 2013, 78(5), 20 pages.
Sone, et al., "Mechanical properties of shale gas reservoir rocks—Part 2: Ductile creep, brittle strength, and their relation to th elastic modulus", Geophysics, 2013, 78(5), 14 pages.
Suarez-Rivera, et al., "Understanding the Effect of Rock Fabric on Fracture Complexity for Improving Completion Design and Well Performance", IPTC 17018, presented at the International Petroleum Technology Conference held in Beijing, China, 2013, 9 pages.
van Kuijk, "A Novel Ultrasonic Cased-Hole Imager for Enhanced Cement Evaluation", International Petroleum Technology Conference (IPTC), Doha, Qatar, 2005, pp. 855-868.
Zemanek, et al., "The Borehole televiewer—a new concept for fracture location and other types of borehole inspection", Journal of Petroleum Technology, 1969, 25, pp. 762-774.
Zeroug, et al., "Ultrasonic Leaky-Lamb Wave Imaging Through a Highly Contrasting Layer", 2003 IEEE Symposium on Ultrasonics, 2003, 1, pp. 794-798.
International Search Report and Written Opinion for the International patent application PCT/US2016/040933 dated Oct. 13, 2016.
International Preliminary Report on Patentability for the International patent application PCT/US2016/040933 dated Jan. 18, 2018.

\* cited by examiner

MEASUREMENT AND PROCESSING TO DETECT WEAK INTERFACIAL LAYERS IN HYDROCARBON-BEARING LAMINATED FORMATIONS WITH ACOUSTIC LOGGING DEVICES

This application claims the benefit of and priority from U.S. Provisional Application Ser. No. 62/188,834 filed on Jul. 6, 2015, which is hereby incorporated by reference herein in its entirety.

TECHNICAL FIELD

The subject disclosure relates to well logging in the oil and gas field. More particularly, the subject disclosure relates to methods for investigating subsurface formations using ultrasonic measurements made in a borehole.

BACKGROUND

Tight hydrocarbon-bearing formations (oil and/or gas) are formations with low peremability, such as tight shale, sandstone, and carbonate. Examples of such hydrocarbon-bearing formations include the Bakken Shale, Eagle Ford Shale, and Niobrara hydrocarbon-bearing formations in North America, the Achimov formation in Russia, the Coober Pedy formation in Australia, etc. In order to economically produce hydrocarbons from these tight formations, horizontal wells are typically drilled at desired depth locations corresponding to the hydrocarbon bearing strata in the formation, and the rock above and below the well is fractured in order to access as much area of hydrocarbon-bearing reservoir as possible.

Optimal completion design and execution depends upon knowledge of the mechanical properties of these tight formations. Tight shale/sand or siltstone/sand/carbonate formations are made of sequences of stiff mineral constituents in contact with compliant organic and/or clay constituents. The thickness of these layers can be as large as a few feet and as thin as several inches (e.g., two inches thick) or even thinner at the sub-inch (mm) scale. However, current state of the art measurements of these formations are largely limited to in-situ sonic measurements at the resolution of a few feet and to laboratory measurements on cores at the resolution of inches. Both measurements have limitations.

Measurements conducted using sonic tools and techniques, for which the signal frequency is at most 20 kHz, average out axially over several feet (e.g., up to 6 feet in some receiver aperture configurations) and radially over 3 to 4 feet into the near-borehole. Real variations in mechanical properties from inch-thick layers are significantly reduced when measured by such tools. These sonic tools do not detect thin layers of weakness unless these happen to be open horizontal fractures which are unlikely to occur in-situ due to the large overburden stress to which the formation is subjected. On the other hand, measurements conducted on cores in the laboratory reflect the conditions of an altered rock given the rock matrix may have relaxed after retirement from its in-situ conditions and may even have been broken or split along fractures and planes of weakness. Although an observation of the rock separating at certain planes is useful information, it does not provide a relative quantification of the weakness that could be encountered in hydraulic fracturing under in-situ conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to methods and systems for detecting thin formation layers that present markedly greater incompentence than that of the surrounding rock in, for example, a laminated shale/siltstone and sandtone/carbonate formation. These formation layers can potentially arrest vertical hydraulic fracture growth. In some such formations the more incompetent (e.g., more compliant, weaker, or less stiff) layers may include shale and/or siltstone and the more competent (e.g., less compliant, stronger, or stiffer) layers may include sandstone and/or carbonate. With these methods, these layers may be interpreted as presenting potential planes of weakness that have bearing on the extent of a hydraulic fracture propagating across them.

One embodiment of the present disclosure is directed to a method of investigating a laminated formation traversed by a borehole. The method includes operating an ultrasonic acoustic logging tool in the borehole to generate pitch-catch measurements along a length of the borehole. Slowness indications (e.g., slowness values and/or wavespeed values) of the formation along the length of the borehole are determined using the pitch-catch measurements. A potential plane of formation weakness along the length of the borehole is determined by identifying a first layer of the formation with a slowness indication that is higher relative to slowness indications for two or more second layers. The first layer is disposed between the two or more second layers.

Another embodiment of the disclosure is directed to a method of investigating a laminated formation traversed by a borehole using both ultrasonic pitch-catch and pulse-echo measurements. The method includes operating an ultrasonic acoustic logging tool in the borehole to generate ultrasonic pitch-catch and pulse-echo measurements. Slowness indications along a length of the borehole as a function of azimuth are generated using the pitch-catch measurements. The mechanical strength of the formation along the length of the borehole is determined using the slowness indications. The borehole radius along the length of the borehole is determined using the ultrasonic pulse-echo measurements. Potential planes of weakness are determined by associating localized increases in borehole radius with first layers of the formation that have mechanical strength lower than that of second layers of the formation. The first layers are each disposed between two or more of the second layers.

A further embodiment of the disclosure is directed to a method of investigating a laminated formation traversed by a borehole. The method includes operating an ultrasonic acoustic logging tool in the borehole to generate ultrasonic pitch-catch measurements of the formation. Slowness indications along a length of the formation as a function of azimuth are generated using the ultrasonic pitch-catch measurements. Mechanical strength of the formation along the length of the borehole is determined using the slowness indications. The method further includes identifying a breakout in the formation. Potential planes of weakness are determined by identifying discontinuities of the breakout at first layers of lesser mechanical strength relative to second layers adjacent to the first layers of lesser mechanical strength.

In some embodiments, ultrasonic high-resolution pitch-catch measurements are made in order to find formation slowness indications of shear (S) and/or compressional (P) waves along desired portions of the borehole/formation. S and or P slowness indications may be plotted as a function of azimuth around the borehole. In one aspect, the S and P slowness indications may be combined in order to generate an indication of the local strength/weakness (compliance) of the formation. Thus, in one embodiment, a plot of Poisson's ratio which is a function of the S and P wave velocities ($V_s$, $V_p$) may be generated. In another embodiment, using information of the formation density ($\rho$) in conjunction with the S and P wave velocities, a plot of Young's modulus is generated to provide an indication of the local strength/weakness (compliance) of the formation. Plots of Poisson's ratio and/or Young's modulus may also be generated as a function of azimuth around the borehole.

In some embodiments, ultrasonic high-resolution pulse-echo measurements are made in order to find indications of the borehole diameter/shape. The shape of the borehole in the formation may be used as a proxy for the compliance of the formation layer as well as a proxy for the interfacial weakness. In one aspect, the axial extent of breakouts (axial discontinuities) imaged by the pitch-catch and/or pulse-echo measurements are attributed to the existence of potential planes of weakness. This information is of value to the optimal design and prediction of a hydraulic fracturing process.

In accordance with one embodiment of the present disclosure, a method uses data acquired by an ultrasonic pitch-catch and pulse-echo measurement tool inside an open hole in a laminated formation to provide a quantification of the mechanical properties of the various layers and borehole shape. Thin layers of relatively high-compliance are associated with a propensity of representing planes of weakness and further provide a quantification of the propensity of weakness during hydraulic fracturing across these layers.

Various embodiments are directed to a method that utilizes a pulse-echo measurement (e.g., solely) to provide borehole shape information and interprets localized increases in the borehole shape (e.g., at substantially all azimuths) as an indication for the presence of planes of weakness. The relative amount of increase may be a proxy for the weakness amplitude. The latter example methods may also provide a proxy for the existence of lamination in the formation with contrasting mechanical compliance. Other embodiments (alternatively or additionally) rely on detecting the axial extent of the breakouts image with the pitch-catch (or pulse-echo) modality and attribute their discontinuities to the existence of a plane of weakness.

In accordance with some embodiments, a high-resolution ultrasonic pitch-catch measurement is used to image the P and S slowness indications (e.g., wavespeed values) in a laminated formation. The wavespeeds are combined with a formation density log to provide logs of formation mechanical strength of the various layers comprising the formation. Thin layers with relatively lower mechanical strength to their surrounding thick layers are indicated as presenting potential planes of weakness.

In accordance with some embodiments, high-resolution ultrasonic pitch-catch and pulse-echo measurements are used to image the P and S slowness indications (e.g., wavespeed values) in a laminated formation and measure the geometry of the borehole. The wavespeeds are combined with a formation density log to provide logs of formation mechanical strength of the various layers in the formation. The borehole geometry is converted to a radius of the borehole. Localized increases in radius associated with thin layers with relatively lower mechanical strength to their surrounding thick layers are indicated as presenting potential planes of weakness.

In accordance with some embodiments, a high-resolution ultrasonic pitch-catch measurement is used to image the P and S slowness indications (e.g., wavespeed values) in a laminated formation. The wavespeeds are combined with a formation density log to provide logs of rock mechanical strength of the various layers within the formation. If breakouts exist, they are imaged and their axial extent is measured. Discontinuities of the breakouts at the at layers of lesser mechanical strength are indicated as presenting planes of weakness.

In accordance with some embodiments, a high-resolution ultrasonic pulse-echo measurement is used to image the geometry of the borehole. The borehole geometry is converted to a radius of the borehole. Localized increases in radius are interpreted as associated with layers of lower mechanical strength relative to their surrounding rock and are indicated as presenting potential planes of weakness.

In any of the embodiments discussed above, the slowness indications for the formation along the length of the borehole can be determined with a resolution of less than or equal to two inches along the length of the borehole. Likewise, the borehole radius along the length of the borehole can be determined with a resolution of less than or equal to two jnches along the length of the borehole.

Any of the method embodiments discussed above can be implemented using a system with an ultrasonic acoustic logging tool and a processing system.

Additional aspects, embodiments, objects and advantages of the disclosed methods may be understood with reference to the following detailed description taken in conjunction with the provided drawings.

DETAILED DESCRIPTION

The term "slowness indication" as used in the claims and the present disclosure includes both slowness values (e.g., time per distance) and reciprocal values, such as wavespeed values and wave velocity values (e.g., distance per time). It should be understood that, when a first layer has a higher slowness value than a second layer, the first layer also has a lower wavespeed value than the second layer because wavespeed is the reciprocal of the wave slowness. Furthermore, the terms "wave velocity", "wavespeed", and "wave slowness" are to be understood to include the other terms when used in the claims and the present disclosure.

Figure 1A:
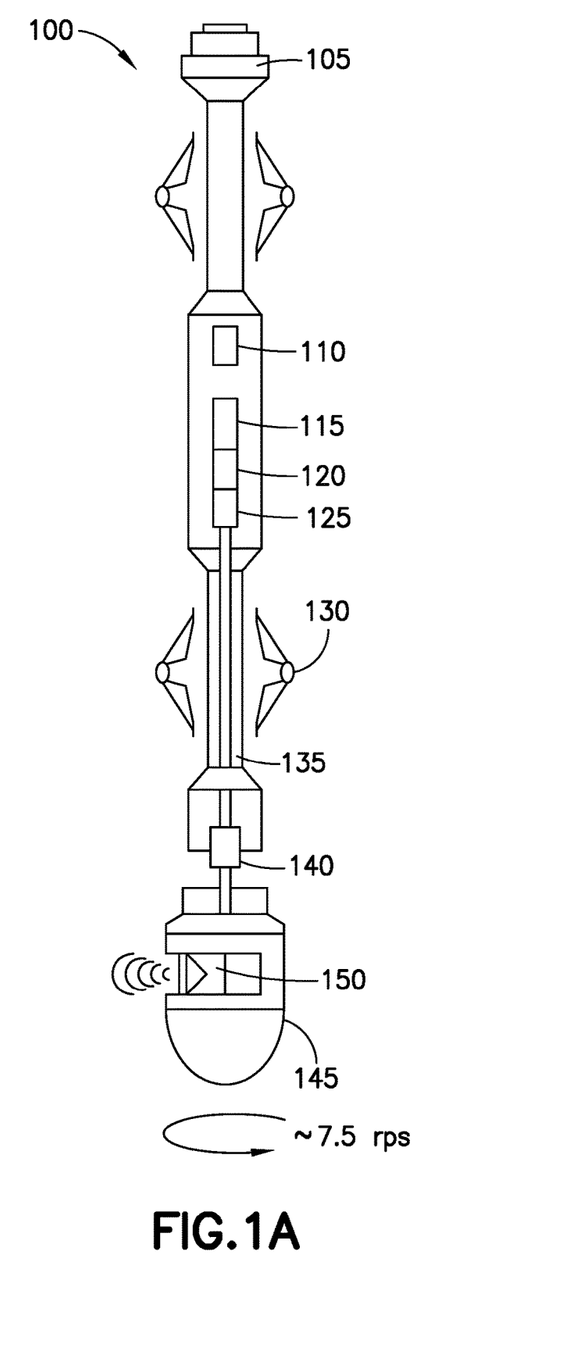
FIG. 1A shows a rotating ultrasonic tool with a pulse-echo transducer.
Figure 1B:
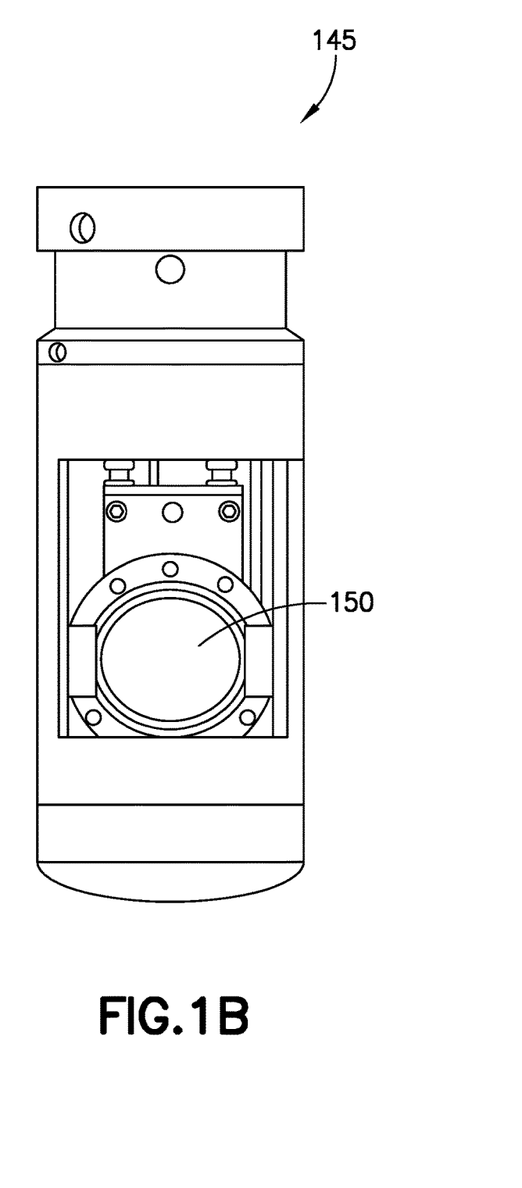
FIG. 1B shows an interchangeable rotating sub of the tool of FIG. 1A.

Ultrasonic pulse-echo measurements can be acquired via a downhole tool, such as a wireline or logging-while drilling (LWD) tool, to provide an azimuthal caliper of the borehole, thereby revealing shape. Such measurements can also be made by a downhole tool in memory mode through a drill pipe. Examples of such downhole tools include Schlumberger's Ultrasonic Borehole Imager or UBI (See J. Zemanek, R. L. Caldwell, E. E. Gleen, S. V. Holcomb, L. J. Norton, and A. J. D. Strauss, The Borehole televiewer—a new concept for fracture location and other types of borehole inspection, JPT 25, 762-774 (1969)). FIGS. 1A and 1B illustrate such a tool 100. The tool 100 includes a sonde 105, a compensating device 110, a motor assembly 115, a gear box assembly 120, a rotating electrical connection 125, a centralizer 130, a rotating shaft with built-in electronics 135, a rotating seal 140, a rotating sub 145 (e.g., an interchangeable rotating sub), and an ultrasonic transducer (e.g., transmitter/receiver) 150. While the term "ultrasonic" is generally defined as relating to a frequency of above 20 kHz, for purposes herein, "ultrasonic" is to be understood as relating to a frequency of 50 kHz or higher. The rotating sub 145 houses the transducer 150. FIG. 1A indicates that the sub rotates about a central axis, e.g., at approximately 7.5 rotations per second, although other rotational speeds may be utilized.

Figure 1C:
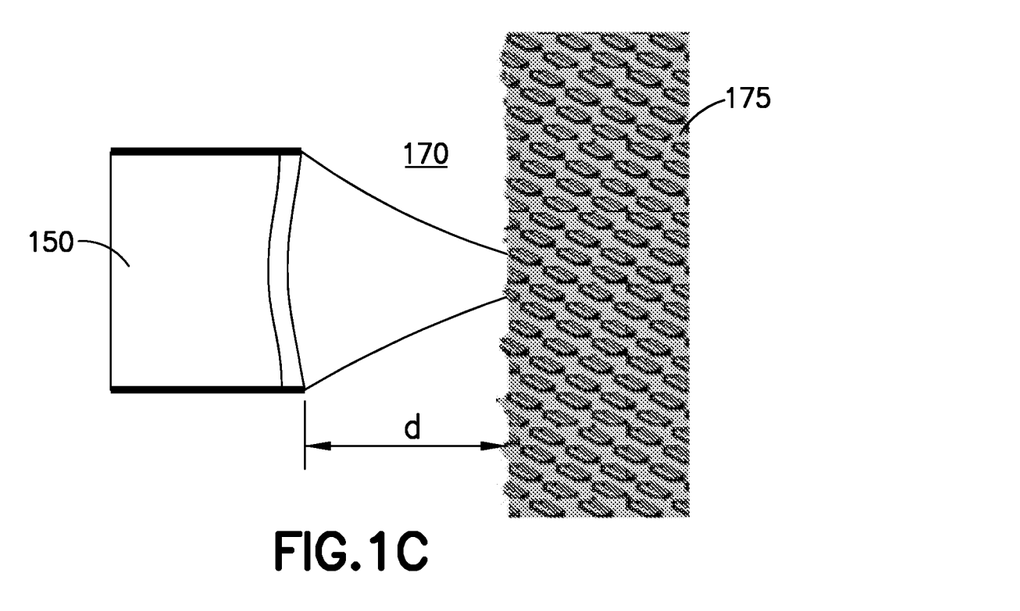
FIG. 1C shows ultrasonic imaging of a formation (e.g., rock) using the transducer of the tool of FIG. 1A.
Figure 1D:
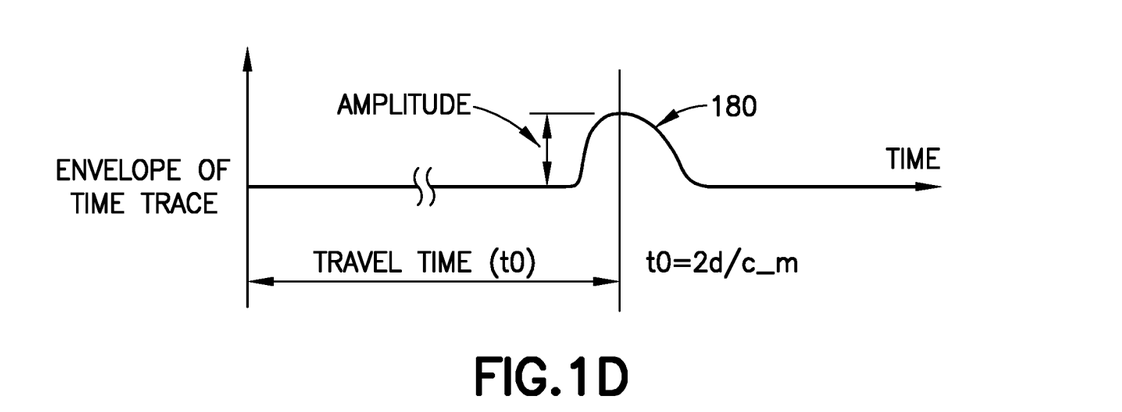
FIG. 1D shows a signal corresponding to the ultrasonic imaging illustrated in FIG. 1C.

FIGS. 1C and 1D show the principle of operation of the pulse-echo technique. In FIG. 1C, a focused ultrasonic transducer 150 located in mud 170 and at a distance d from the formation 175 generates a signal which bounces off the formation and is received and recorded by the transducer 150. In one embodiment, the bandwidth of the signal spans a wide range from 50 kHz to above 800 kHz with a center frequency of either 250 kHz or 500 KHz depending on the logging mud used. A plot of the envelope of the signal received and exhibiting an echo 180 due to reflection at the borehole wall for every position of the rotating sub 145 is seen in FIG. 1D (See R. M. Havira, Ultrasonic techniques in oil well logging, in Proc. IEEE Ultrason. Symp., 563-571, November 1986). The travel time t0 is equal to twice the distance d divided by the speed of the signal in the mud $c_m$; $t0=2d/c_m$.

Figure 2A:
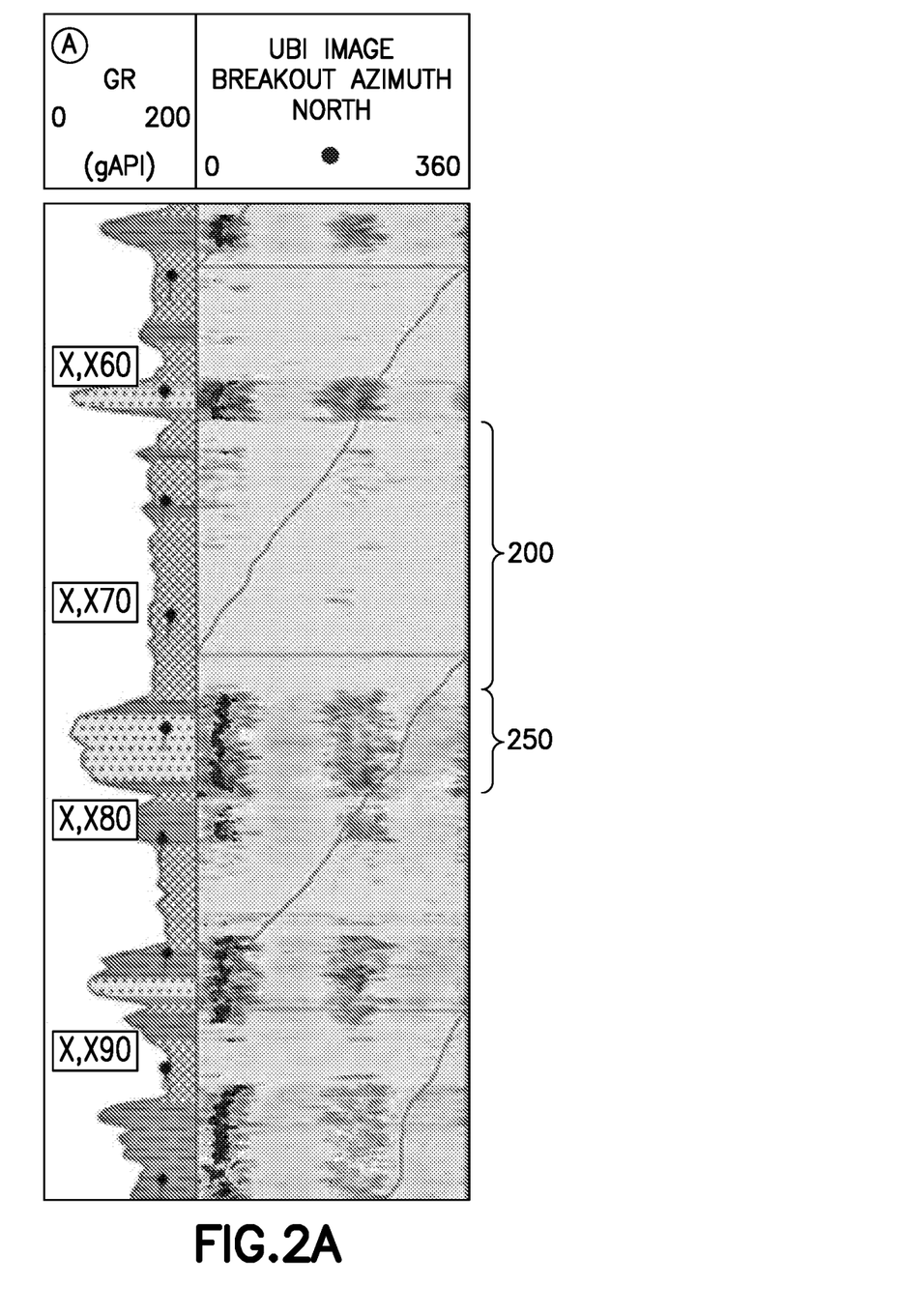
FIG. 2A shows a logged image obtained from the ultrasonic tool along a depth in a borehole as a function of azimuth, adjacent a gamma ray (GR) log.
Figure 2B:
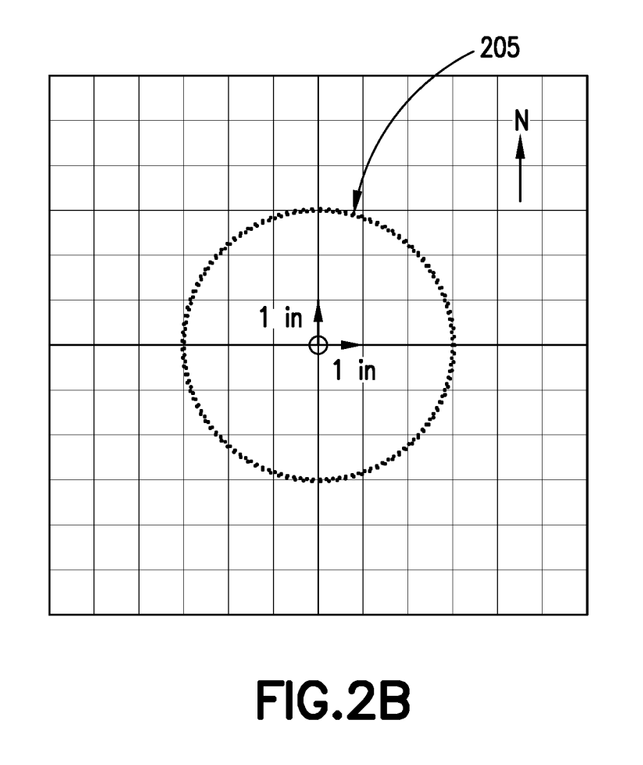
FIG. 2B shows a cross-sectional shape corresponding to a zone of FIG. 2A that is without a breakout.
Figure 2C:
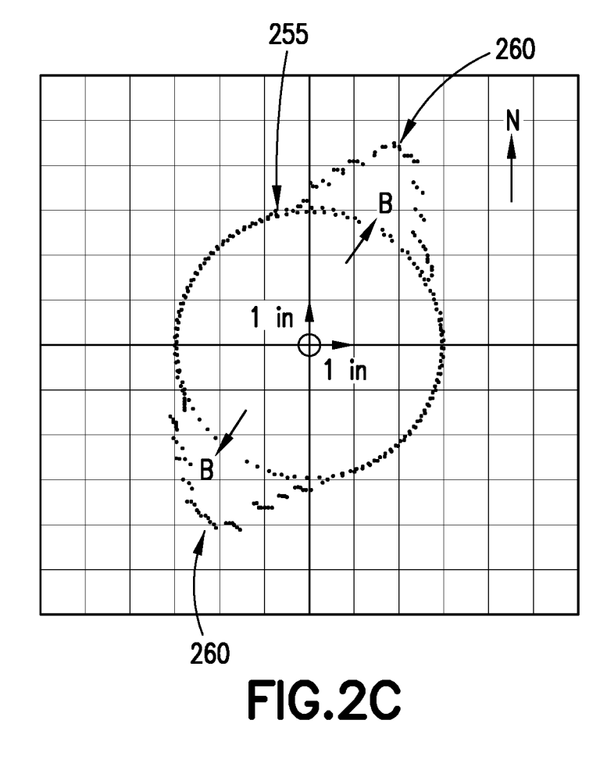
FIG. 2C shows a cross-sectional shape corresponding to a zone of FIG. 2A that includes a breakout.

By associating travel time with color or gray-scale, the travel time of the ultrasound signal may be displayed as an image as a function of azimuth (i.e., angle of the measurement within a plane transverse, e.g., perpendicular, to the longitudinal axis of the borehole at the measurement location) and depth in the hole. FIG. 2A shows an example of the gray-scale travel time image. FIG. 2A shows several zones, including zones such as zone 200, which appear substantially uniform across azimuth, and zone 250 which appears non-uniform across azimuth. Thus, zone 200 suggests a well-rounded hole such as seen in FIG. 2B where a round cross-sectional shape 205 is shown, whereas zone 250 suggests a non-uniform cross-sectional shape where the circle 255 extends into breakouts 260 is in FIG. 2C. (see "Borehole Imaging," in Sonatrach-Schlumberger Well Evaluation Conference—Algeria 2007, pp 3.28-3.65 (Published by Schlumberger, 2007)). Thus, FIG. 2A reveals multiple breakout zones, separated by zones of uniform borehole diameter. The left plot of FIG. 2A shows a gamma ray GR plot which reads below 100 gAPI in sand intervals such as in zones 250 exhibiting breakouts 260 and above 100 gAPI in shale intervals such as in zones 200 that have round cross-sectional shape.

In addition to imaging breakouts, this pulse-echo type of measurement may also be used to image open fractures intersecting the borehole as well as borehole deformations due to shear movement during drilling at a pre-existing fault plane (See "Borehole Imaging," in Sonatrach-Schlumberger Well Evaluation Conference—Algeria 2007, pp 3.28-3.65 (Published by Schlumberger, 2007)). But aside from imaging the geometry of the borehole and its features, the data from this type of measurement have not been examined and used for information related to the mechanical properties of the formation and in particular in the context of laminated tight hydrocarbon-bearing formations.

Figure 3:
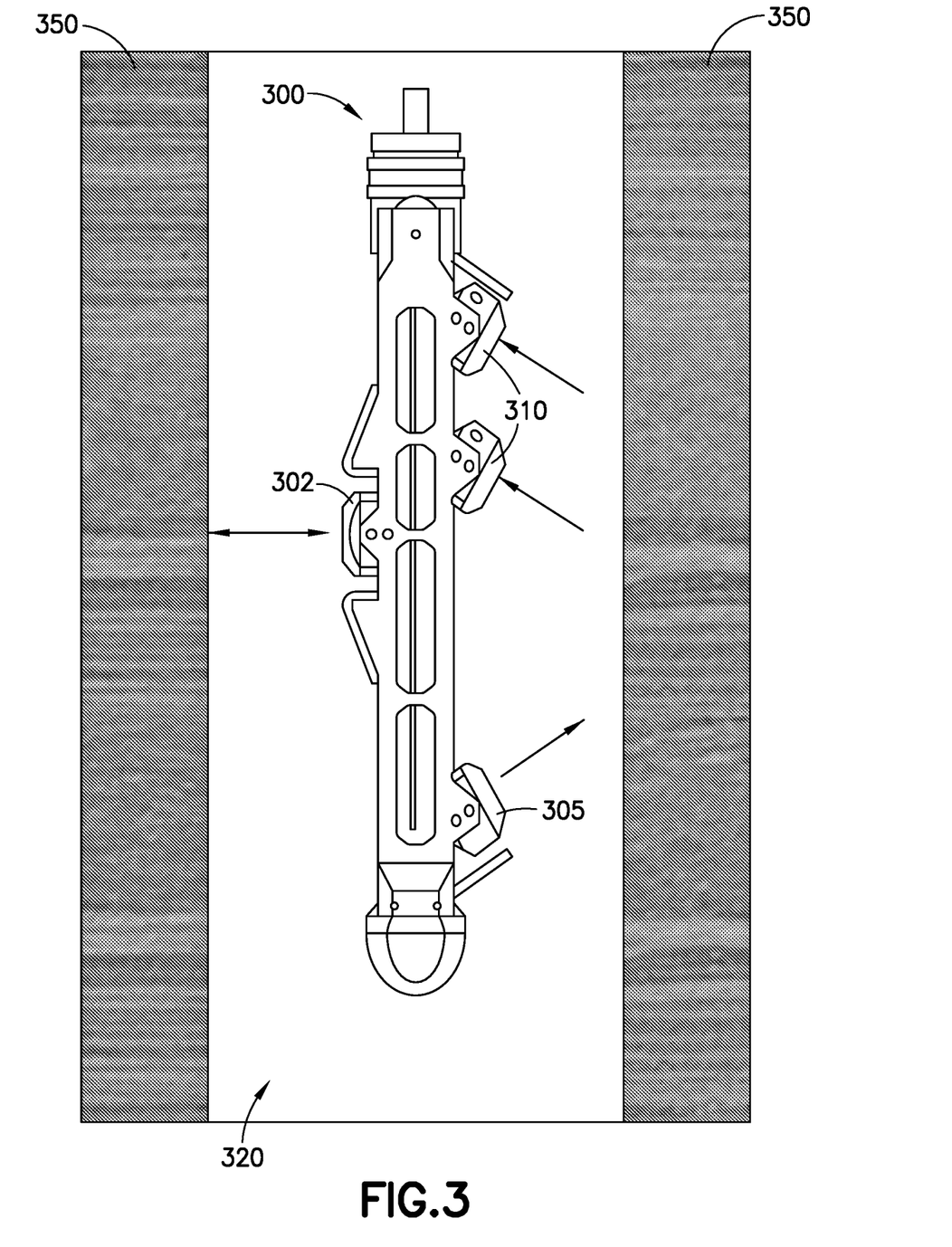
FIG. 3 shows a rotating ultrasonic tool with transducers and receivers for implementing both pitch-catch and pulse-echo modalities.

Turning now to FIG. 3, a tool 300 is shown disposed in a borehole 320 traversing a formation 350. The tool 300 is shown with a pulse-echo transducer 302 (which functions as described above with respect to transducer 150 of FIG. 1A) and with ultrasonic pitch-catch equipment. The pitch-catch equipment includes an ultrasonic transmitter 305 spaced approximately ten inches from the nearest receiver, with two ultrasonic receivers 310 spaced at approximately four inches apart from each other (See S. Zeroug and B. Froelich, "Ultrasonic leaky-lamb wave imaging through a highly contrasting layer," in 2003 IEEE Symposium on Ultrasonics, pages 794-798, Vol. 1, 2003, and R. van Kuijk, S P E, S. Zeroug, B. Froelich, M. Allouche, S. Bose, D. Miller, J.-L. le Calvez, V. Schoepf, and A. Pagnin; "A Novel Ultrasonic Cased-Hole Imager for Enhanced Cement Evaluation", International Petroleum Technology Conference (IPTC), 21-23 Sep. 2005, Doha, Qatar, both of which are hereby incorporated by reference in their entireties herein). With two detectors, the arrival time of the sound wave of relevance may be detected at both receivers, and the difference in transit time (zit) may be used in conjunction with the distance between the detectors to provide an indication of the velocity (or slowness) of the (ultra)sound wave in question (which can be either compressional (P) or shear (S) as identified by one of ordinary skill in the art of acoustic measurement). Of course, other techniques may likewise be used to identify the pertinent signal and determine the sound wave velocity in the formation, or reciprocally, the formation slowness. It should be understood that tool 300 may include additional ultrasonic transmitters and/or receivers axially and/or azimuthally spaced around the tool and that the spacing of the receivers may be different.

In some embodiments, the properties of the formation and/or the properties of the borehole along the length of the borehole are determined with a resolution of less than or equal to two inches along the length of the borehole. The properties may include borehole radius values from pulse-echo measurements and wave slowness values, wave velocity values, and/or wavespeed values from pitch-catch measurements. For example, a two inch resolution means that a wave velocity value can be determined for each two-inch interval along the length of the borehole. In one specific embodiment, the resolution for the pitch-catch measurements can vary between one-quarter inch and two inches. In another specific embodiment, the resolution for the pulse-echo measurement can be less than a quarter of an inch. Higher resolutions can be achieved (i) by reducing the spacing between receivers on the ultrasonic tool (for the pitch-catch measurement) and/or (ii) by using higher spatial acquisition rates along the length of the borehole which translate into slower logging speeds for the ultrasonic tool.

A tool corresponding to tool 300 was logged in a vertical open-hole in a laminated siltstone and carbonate formation at a logging speed permitting a resolution for slowness determinations of less than or equal to two inches. In this configuration, the pitch-catch technique was used to excite and detect signals that enter the formation and propagate in the near-wellbore before emerging in the borehole fluid where they were collected by the apertures of the receivers 310. Because of the high-frequency content of ultrasonic signals, the transmitter 305 emits collimated acoustic beams while the receivers 310, by reciprocity, collect in a collimated fashion with their finite apertures. The excitation of waves that sample the near-wellbore and their detection occur most efficiently when the transmitting and receiving transducers (and hence their acoustic beams) are aligned at two specific angles associated with the compressional and shear waves, respectively, that can propagate in the near wellbore in the presence of borehole fluid.

Consequently, in logging the laminated formation, the tool was logged in the hole twice. The first logging was conducted with the transducers aligned at a small angle (15 degrees) with respect to the normal to the borehole wall to couple acoustic energy to the formation compressional (P) wave, and the second logging was conducted at a larger angle (28 degrees) to couple to the shear (S) wave. In the second logging, the beam, strictly speaking, couples most intensely to the pseudo-Rayleigh surface wave whose wavespeed is very close to the shear wave. For the purpose of this patent application, however, the associated wavespeed is referred to as shear wavespeed.

Figure 4:
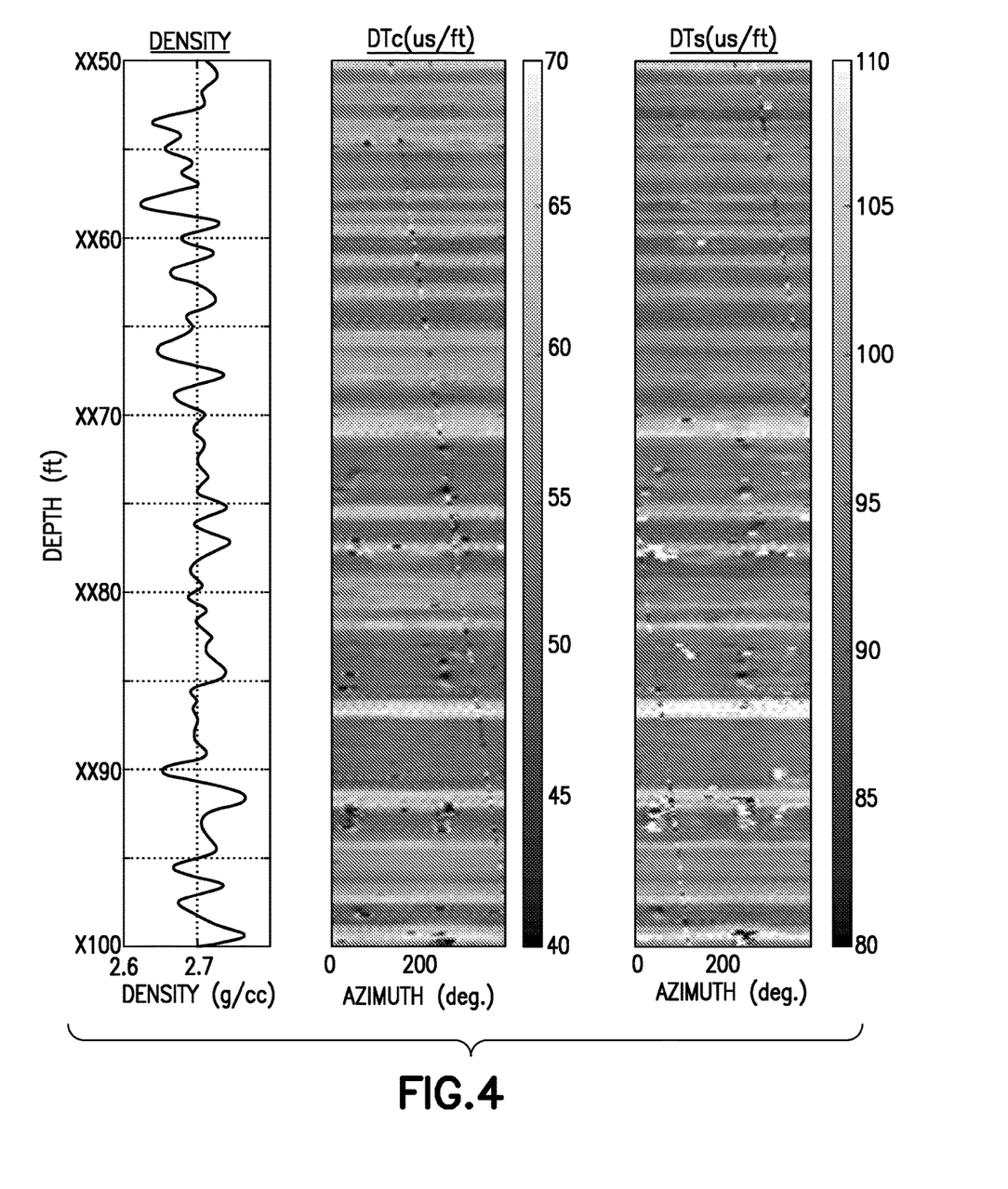
FIG. 4 shows a density log (left track), and high-resolution azimuthal and axial images of compressional (middle track) and shear (right track) slownesses in a laminated shale/siltstone and sand/carbonate formation obtained from the pitch-catch transducer/receivers of FIG. 3.

The signals from the first and second logging were processed using relevant signal time processing to extract indications of the compressional (P) and shear (S) wavespeeds or indications of their reciprocals, the P and S slownesses, at a resolution of approximately one inch. FIG. 4 plots the P and S slownesses estimated in a fifty-foot depth interval of formation 350. The P and S slowness values in this vertical well are related to the stiffness matrix elements $C_{33}$ and $C_{44/55}$ for a vertically-transverse isotropic (VTI) formation. The slowness images, plotted as a function of azimuth (horizontal) and depth (vertical), show a sequence of thick and competent (strong) carbonate layers (shown in darker gray with a slowness of between about 90 and 100 microseconds/foot for the shear and between about 50 and 60 microseconds/foot for the compressional) separated by thin and relatively incompetent (weaker) siltstone layers (shown in light gray or white with slownesses of between about 100 and 110 microseconds/foot for the shear and between about 60 and 70 microseconds/foot for the compressional). The incompetent layers are seen to be as thin as a few inches (see, e.g., layers at xx60, xx62, xx64, etc.) and as thick as a foot or two (see, e.g., layer at xx70-71.5). The high contrast in slowness between these two components of the laminated formation is as high as 30-40% for P and 20-30% for S.

According to one aspect, it is believed that the thinner an incompetent layer is and the more incompetent (weaker) it is with respect to the adjacent rock, the more likely it is to play a critical role in affecting the extent of the hydraulic propagation as the propagation intersects the layer. More specifically, the thin and highly contrasting incompetent layer is likely to present a plane of weakness that could arrest the hydraulic fracture propagation and deviate the fracture along the plane of the thin layer. It is believed that laminated beds affect fracture growth patterns and these effects are expressed in fracture height containments (See J. Miskimins and R. D. Barree, "Modeling of Hydraulic Fracture Height Containment in Laminated Sand and Shale Sequences," SPE 80935, 2003). Arresting of hydraulic fractures at a plane of weakness has been studied and documented through laboratory studies (See Suarez-Rivera R. et al., "Understanding the effects of rock fabric on fracture complexity for improving completion design and well performance," IPTC 17018, Beijing China, 2013).

It is noted that in a laminated formation as shown in FIG. 4, the conventional sonic measurement typically used to estimate rock slowness and mechanical property contrast between the various layers would average out the contrast due to its large probing wavelength (of the order of several feet) and corresponding to its large receiver array. Accordingly, a sonic measurement would fail to detect the presence of potential planes of weakness and would fail to estimate the extent of the compliance contrast.

In accord with one aspect, the high-resolution determinations of the S and P wavespeeds (and/or slownesses) may be used alone or in conjunction with determinations of the formation density (a log of which is shown in FIG. 4 (left track)) to generate a high-resolution indication of the mechanical strength of the formation. In particular, Poisson's ratio and Young's modulus are both considered indications of formation mechanical strength, with the terms "compliance" and "strength" being used interchangeably herein. Poisson's ratio is defined according to $$v = \frac{1}{2} \frac{(V_p/V_s)^2 - 2}{(V_p/V_s)^2 - 1},$$

where $V_s$ is the shear wavespeed and $V_p$ is the P wavespeed. Young's modulus is defined according to $$E = \frac{\rho V_s^2 (3V_p^2 - 4V_s^2)}{V_p^2 - V_s^2},$$

where $\rho$ is the density of the rock, $V_s$ is the shear wavespeed and $V_p$ is the P wavespeed. As these wavespeeds pertain to a vertical well, the corresponding Young's modulus and Poisson's ratio are referred to as vertical Young's modulus and vertical Poisson's ratio as opposed their their horizontal counterparts that may be estimated from measurements in a highly-deviated or horizontal well. The rock density p may be obtained from information acquired during drilling by a tool such as a neutron-gamma density (NGD) tool or from standard borehole density tools that can be run with or without the ultrasonic tool such as Schlumberger's Platform Express tool.

Figure 5:
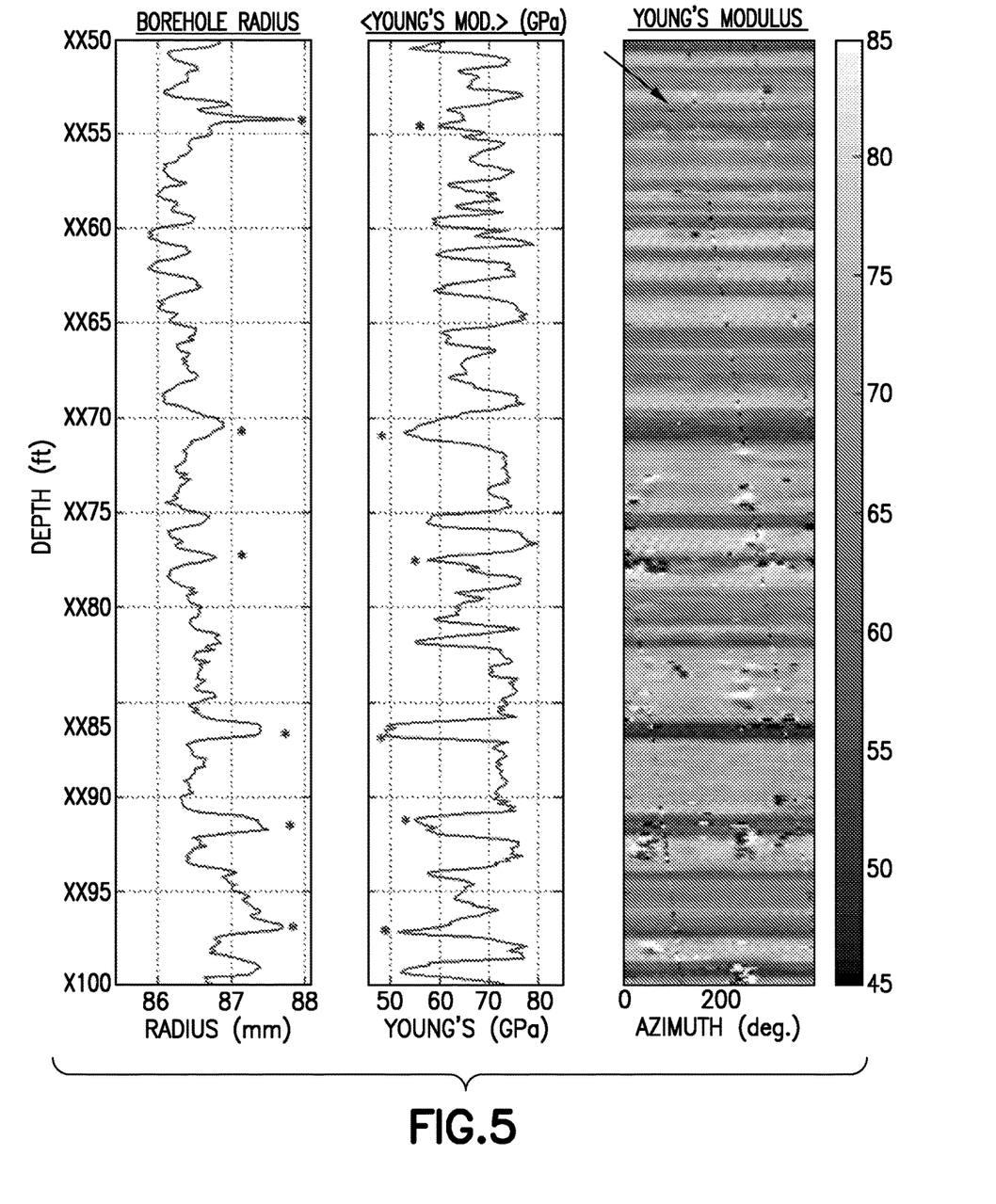
FIG. 5 shows a plot of the borehole radius (left track) obtained from the pulse-echo transducer of FIG. 3, and azimuthal and axial images of Young's modulus (middle and right tracks) obtained from processing the signals of the pitch-catch transducer/receivers of FIG. 3.

Logs of the vertical Young's modulus for the borehole section of FIG. 4 are shown in FIG. 5. The right-hand plot of FIG. 5 is a Young's modulus plot (in gigaPascal or GPa) at approximately one-inch resolution as a function of azimuth, and the middle plot of FIG. 5 is a plot of the average Young's modulus (across azimuth) as a function of depth in the borehole. It will be appreciated from the two Young's modulus plots that thin layers of both relatively low and high Young's modulus values are present. By way of example only, relatively low value Young's modulus layers are seen at, e.g., depths xx99, xx97, xx86-xx87, xx70-xx71 (with Young's modulus values between 45 GPa and 55 GPa), while relatively high value Young's modulus layers are seen at, e.g., depths xx53, xx60-xx61, xx61.5-xx62.5, xx63.5-xx65, xx76-xx77 and xx97-xx98 (with Young's modulus values between 75 GPa and 85 GPa).

The left-most plot of FIG. 5 is a borehole radius plot that was determined from the echo travel time data from the ultrasonic pulse-echo measurement of tool 300. Such plots can also be obtained from other measurments. The radius plot shows an increase in the borehole radius at the location of the incompetent layers that exhibit relatively lower values of Young's modulus. The correlation between the radius excursion and Young's modulus is significant. In FIG. 5, the correlation between radius excursion and Young's modulus is indicated qualitatively at certain depths with stars (*). By way of example, around depth xx86, the radius increase is highly localized and significant. Similarly, around depth xx54, the radius increase is highly localized and significant. A close examination of the images of Young's modulus indicates the presence of a very thin incompetent layer (as pointed to with the arrows near xx54 in both images). The increase in radius may have a number of explanations. It could correspond to a compression or a positive creep of the incompetent layers—a phenomenon recently observed and documented in laboratory measurements (See Sone, H., and M. D. Zoback, "Mechanical properties of shale gas reservoir rocks—Part 2: Ductile creep, brittle strength, and their relation to the elastic modulus," Geophysics, 78, 2013). It could also have happened due to the fact that the siltstone layers have weaker cohesive strength than the carbonate layers and are preferentially eroded on the open face of the borehole. This is analogous to looking at a rock outcrop, where the weaker rock is recessed because it is more vulnerable to the environment. A third explanation may be that recessed siltstone results from greater compression of the rock during the drilling process.

According to one aspect, wherever a siltstone or shale or arguably even a lithology-unknown thin bed erodes or compresses (i.e., leading to an increase in the borehole radius) and is associated with a relative higher compliance (e.g., lower Young's modulus value) to that of the surrounding layers, the thin bed is determined to represent a potential plane of weakness.

In one aspect, a correlation may also be found between the radius excursion and excursions in slowness values. Thus, wherever a siltstone or shale or arguably even a lithology-unknown thin bed erodes or compresses (i.e., leading to an increase in the borehole radius) and is associated with a relative higher compliance to that of the surrounding layers as evidenced by higher S and/or P slowness values, the thin bed is determined to represent a potential plane of weakness.

According to one aspect, it may be argued that whenever a silstone or shale or even a lithology-unknown thin bed erodes or compresses, an increase of borehole radius around the entire circumference of the borehole alone implies a potential plane of weakness.

In one embodiment, a log of Poisson's ratio (which is an indicator of compliance) may be used instead of or in addition to using a plot of Young's modulus in order to identify thin incompetent layers which are determined to represent potential planes of weakness. In one embodiment, the log of Poisson's ratio may be compared to the plot of borehole radius excursion, and a correlation between the two may be utilized to identify potential planes of weakness.

Figure 6:
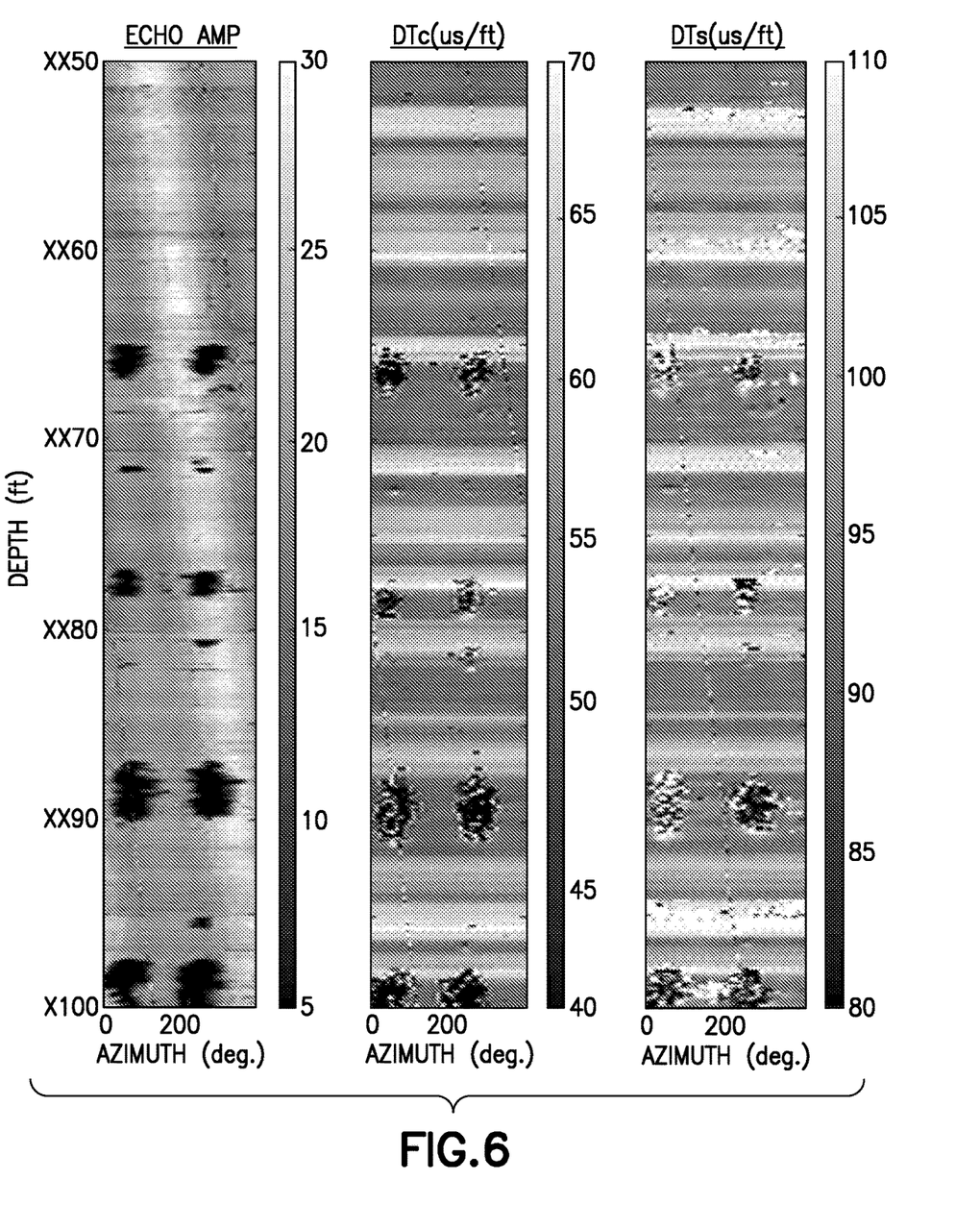
FIG. 6 shows a pulse-echo image (left track) and a plot of high-resolution azimuthal and axial images of compressional (middle track) and shear (right track) slownesses in a laminated shale/siltstone and sand/carbonate formation with the images exhibiting breakouts.

Turning to FIG. 6, the center and right plots are gray-scale images showing the P and S slownesses estimates in a fifty-foot depth interval of formation 350 (different than the interval of FIG. 4) as a result of a pitch-catch ultrasonic scanning. The left panel of FIG. 6 is an echo amplitude plot of the pulse-echo scanning similar to that of FIG. 2A taken along the same fifty foot length of borehole 350 as the pitch-catch scanning that provided the right and middle plots of FIG. 6. The echo amplitude image shows azimuthal discontinuities having relatively low echo amplitude (shown in black).

It is also noted that the discontinuities at any given depth tend to be spaced 180° apart from each other, and the discontinuities at different depths generally appear at the same or nearly the same azimuths across those depths. In one aspect, breakouts arise from compressive failure of the rock when subjected to a horizontal stress differential which is high enough to overcome the rock strength.

The slowness images, plotted in the center and right plots of FIG. 6 as a function of azimuth and depth, show a sequence of thick and competent (very stiff) carbonate layers (shown in darker gray with a slowness of between about 90 and 100 miscroseconds/foot for the shear and between about 50 and 60 microseconds/foot for the compressional) separated by thin and relatively incompetent (more compliant) siltstone layers (shown in light gray or white with slownesses of between about 100 and 110 microseconds/foot for the shear and between about 60 and 70 microseconds/foot for the compressional). Some incompetent layers are seen to be as thin as a few inches (see, e.g., the layer at xx85), and as thick as a foot or two (see, e.g., the layer at xx58 xx62). The slowness images also show azimuthal discontinuities which are the breakouts identified in the pulse-echo amplitude (left plot). They have relatively low slownesses (shown in black) which are the result of artefacts in the processing arising from the complexity in the signals scattered from these breakouts. In accord with one aspect, these discontinuities are showing breakouts which are occurring in competent carbonate layers.

Where breakouts are exhibited by the high-resolution slowness imaging with the pitch-catch modality, they can be examined for where they occur and for their axial extent. For example, discontinuities are seen at depths x100-xx98, xx92-xx87, xx78-xx77, xx66-xx65. These breakouts are occurring almost exclusively in the competent carbonate (darker gray) layers and they appear to be arrested at intersections with more complaint siltstone layers (lighter gray or white).

In one aspect, the location where these breakouts are discontinued (e.g., arrested) are determined to indicate a potential plane of formation weakness, re-enforcing the other indicators discussed above.

Some embodiments provide a method that utilizes a pulse-echo measurement (e.g., solely) to provide borehole shape information (e.g., radius as a function of azimuth) and interprets localized increases in the borehole shape as an indication for the presence of planes of weakness. The left-most plot of FIG. 5 is a borehole radius plot that was determined from echo travel time data from ultrasonic pulse-echo measurements. Localized increases in the borehole shape are called out at certain depths with stars (*). In some embodiments, a localized increase in the borehole shape at substantially all azimuths is interpteted as an indication for the presence of planes of weakness. The relative amount of increase may be a proxy for the weakness amplitude. The latter example methods may also provide a proxy for the existence of lamination in the formation with contrasting mechanical compliance. Other embodiments (alternatively or additionally) rely on detecting the axial extent of the breakouts image with the pitch-catch (or pulse-echo) modality and attribute their discontinuities to the existence of a plane of weakness.

It will be appreciated that measurements that indicate the presence of a plane of weakness and quantify certain mechanical properties of pertinence to hydraulic fracturing are highly desirable, and measurements that are conducted in-situ are more desirable than those conducted in a laboratory setting on cores.

In one aspect, some of the methods and processes described above are performed by a processing system. For example, (i) determinations of slowness indications and borehole radius, (ii) calculations of Young's modulus and Poisson's ratio, and (iii) identification of layers and features (e.g., breakouts) within borehole logs may be performed by a processing system. The term "processing system" should not be construed to limit the embodiments disclosed herein to any particular device type or system. The processing system may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Thus, by way of example only, and not by way of limitation, while various embodiments describe particular ultrasonic tools for determining slowness indications, it will be appreciated that other ultrasonic tools could be utilized. Also, while Poisson's ratio and Young's modulus values were described as representing indications of formation mechanical strength, it will be appreciated that the mechanical strength of the formation could be otherwise represented. Accordingly, all such modifications are intended to be included within the scope of this disclosure as defined in the following claims.

What is claimed is:

1. A method of investigating a laminated formation traversed by a borehole, the method comprising:
   operating an ultrasonic acoustic logging tool in the borehole to generate pitch-catch measurements along a length of the borehole;
   determining slowness indications of the formation along the length of the borehole using the pitch-catch measurements; and
   determining a potential plane of formation weakness along the length of the borehole by identifying a first layer of the formation with a slowness indication that is higher relative to slowness indications for two or more second layers, wherein the first layer is disposed between the two or more second layers.

2. The method of claim 1,
   wherein determining the slowness indications comprises generating compressional wave and shear wave slowness indications of the formation along the length, and
   wherein identifying the first layer of the formation disposed between the two or more second layers comprises combining the compressional wave and shear wave slowness indications to generate a log of an indication of mechanical strength of the formation along the length.

3. The method of claim 2, wherein the combining comprises combining according to:

$$v = \frac{1}{2} \frac{(V_p/V_s)^2 - 2}{(V_p/V_s)^2 - 1},$$

wherein v is Poisson's ratio which is the indication of the mechanical strength, $V_s$ is shear wavespeed and $V_p$ is compressional wavespeed.

4. The method of claim 2, further comprising:
   obtaining a determination of a density of the formation along the length, wherein the combining comprises combining according to:

$$E = \frac{\rho V_s^2 (3V_p^2 - 4V_s^2)}{V_p^2 - V_s^2},$$

wherein E is Young's modulus, which is the indication of the mechanical strength, ρ is the density determination, $V_s$ is shear wavespeed and $V_p$ is compressional wavespeed.

5. The method of claim 1, wherein the each of the two or more second layers are thicker than the first layer.

6. The method of claim 5, wherein the first layer is less than or equal to two inches thick.

7. The method of claim 1, wherein the first layer is comprised of incompetent rock and the two or more second layers are each comprised of competent rock.

8. The method of claim 7, wherein the first layer is comprised of at least one of (a) shale and (b) siltstone, and the two or more second layers are each comprised of at least one of (a) sandstone and (b) carbonate.

9. The method of claim 1, wherein operating the ultrasonic acoustic logging tool further comprises:
generating pulse-echo measurements along the length of the borehole;
using the pulse-echo measurements to measure a radius of the borehole; and
associating a localized increase in borehole radius with an identified first layer to confirm that the first layer represents a plane of formation weakness.

10. The method of claim 9, wherein the two or more second layers are thicker than the first layer.

11. The method of claim 10, wherein said first layer is less than or equal to two inches thick.

12. The method of claim 1, further comprising:
using the pitch-catch measurements to identify a breakout along a length of the borehole; and
identifying a discontinuity of the breakout at the first layer to confirm that the first layer represents a plane of formation weakness.

13. The method of claim 1, further comprising:
generating pulse-echo measurements along the length of the borehole;
using at least one of the pitch-catch measurements and the pulse-echo measurements to identify a breakout along a length of the borehole; and
identifying a discontinuity of the breakout at the first layer using the pitch-catch measurements to confirm that the first layer represents a plane of formation weakness.

14. The method of claim 1, wherein the slowness indications for the formation along the length of the borehole are determined with a resolution of less than or equal to two inches.

15. A system for investigating a laminated formation traversed by a borehole, the system comprising:
an ultrasonic acoustic logging tool configured to generate pitch-catch measurements along a length of the borehole; and
a processing system configured to (i) determine slowness indications of the formation along the length of the borehole using the pitch-catch measurements and (ii) determine a potential plane of formation weakness along the length of the borehole by identifying a first layer of the formation with a slowness indication that is higher relative to slowness indications for two or more second layers, wherein the first layer is disposed between the two or more second layers.

16. The system of claim 15, wherein the slowness indications of the formation along the length of the borehole are determined with a resolution of less than or equal to two inches.

17. The system of claim 15, wherein the ultrasonic tool is further configured to generate pulse-echo measurements along the length of the borehole and the processing system is further configured to (iii) measure a radius of the borehole using the pulse-echo measurements and (iv) associate a localized increase in borehole radius with an identified first layer to confirm that the first layer represents a plane of formation weakness.

18. The system of claim 15, wherein the processing system is further configured to (iii) identify a breakout along a length of the borehole using the pitch-catch measurements and (iv) identify a discontinuity of the breakout at the first layer to confirm that the first layer represents a plane of formation weakness.

19. The system of claim 15, wherein the ultrasonic tool is further configured to generate pulse-echo measurements along the length of the borehole and the processing system is further configured to (iii) identify a breakout along a length of the borehole using at least one of the pitch-catch measurements and the pulse-echo measurements and (iv) identify a discontinuity of the breakout using the pitch-catch measurements at the first layer to confirm that the first layer represents a plane of formation weakness.

20. A method of investigating a laminated formation traversed by a borehole, the method comprising:
operating an ultrasonic acoustic logging tool in the borehole to generate ultrasonic pitch-catch and pulse-echo measurements;
generating slowness indications along a length of the borehole as a function of azimuth using the pitch-catch measurements;
determining mechanical strength of the formation along the length of the borehole using the slowness indications;
determining borehole radius along the length of the borehole using the ultrasonic pulse-echo measurements; and
determining potential planes of weakness by associating localized increases in borehole radius with first layers of the formation that have mechanical strength lower than that of second layers of the formation, wherein the first layers are each disposed between two or more of the second layers.

21. The method of claim 20, wherein the first layer is comprised of incompetent rock and the two or more second layers are each comprised of competent rock.

22. The method of claim 21, wherein the first layers are each comprised of at least one of (a) shale and (b) siltstone, and the second layers are each comprised of at least one of (a) sandstone and (b) carbonate.

23. The method of claim 20, wherein the mechanical strength of the formation along the length of the borehole is determined using a density log.

24. The method of claim 20, wherein the slowness indications of the formation along the length of the borehole are determined with a resolution of less than or equal to two inches.

25. A method of investigating a laminated formation traversed by a borehole, the method comprising:
operating an ultrasonic acoustic logging tool in the borehole to generate ultrasonic pitch-catch measurements of the formation;
generating slowness indications as a function of azimuth along a length of the formation using the ultrasonic pitch-catch measurements;
determining mechanical strength of the formation along the length of the borehole using the slowness indications;
identifying a breakout in the formation; and
determining potential planes of weakness by identifying discontinuities of the breakout at first layers of lesser mechanical strength relative to second layers adjacent to the first layers of lesser mechanical strength.

26. The method of claim 25, wherein the second layers are thicker than the first layers of lesser mechanical strength.

27. The method of claim 25, wherein the layers of lesser mechanical strength are comprised of incompetent rock and the layers adjacent to the layers of lesser mechanical strength are each comprised of competent rock.

28. The method of claim 27, wherein the layers of lesser mechanical strength are each comprised of at least one of (a) shale and (b) siltstone, and the layers adjacent to the layers of lesser mechanical strength are each comprised of at least one of (a) sandstone and (b) carbonate.

29. The method of claim 25, wherein the mechanical strength of the formation along the length of the borehole is determined using a density log.

30. The method of claim 25, wherein the slowness indications of the formation along the length of the borehole are determined with a resolution less than or equal to two inches.

31. A method of investigating a laminated formation traversed by a borehole, the method comprising:
- operating an ultrasonic acoustic logging tool in the borehole to generate ultrasonic pulse-echo measurements of the formation;
- determining borehole shape along a length of the borehole using the ultrasonic pulse-echo measurements; and
- determining potential planes of weakness by identifying localized increases in the borehole shape.

32. The method of claim 31, wherein the borehole shape comprises borehole radius as a function of azimuth.

33. The method of claim 32, wherein determining potential planes of weakness by identifying localized increases in the borehole shape comprises determining potential planes of weakness by identifying localized increases in the borehole radius at all azimuths.

34. The method of claim 31, wherein the borehole shape along the length of the borehole is determined with a resolution less than or equal to two inches.

* * * * *